United States Patent
Chung et al.

(10) Patent No.: US 9,544,957 B1
(45) Date of Patent: Jan. 10, 2017

(54) ILLUMINATION DEVICE

(71) Applicant: PARAGON SEMICONDUCTOR LIGHTING TECHNOLOGY CO., LTD., New Taipei (TW)

(72) Inventors: Chia-Tin Chung, Miaoli County (TW); Shih-Neng Tai, Taoyuan County (TW)

(73) Assignee: PARAGON SEMICONDUCTOR LIGHTING TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/957,275

(22) Filed: Dec. 2, 2015

(51) Int. Cl.
*H05B 33/08* (2006.01)
*H05B 37/02* (2006.01)

(52) U.S. Cl.
CPC ...... *H05B 33/0815* (2013.01); *H05B 33/0812* (2013.01); *H05B 33/0845* (2013.01); *H05B 37/0227* (2013.01)

(58) Field of Classification Search
CPC . H05B 37/02; H05B 37/0227; H05B 37/0245; H05B 33/08; H05B 33/0812; H05B 33/0815; H05B 33/0845; G08B 13/19; G08B 13/191; G08B 13/1436
USPC ............... 315/149, 152, 158, 186, 291, 307, 308,315/312; 340/539.23, 539.26, 541, 555
See application file for complete search history.

(56) References Cited

U.S. PATENT DOCUMENTS

| | | | | |
|---|---|---|---|---|
| 6,710,346 B2* | 3/2004 | Brewington | ......... | G08B 13/181 250/341.8 |
| 6,943,685 B2* | 9/2005 | Seo | ....... | G08B 13/191 340/541 |
| 7,633,406 B2* | 12/2009 | Miki | ........ | H05B 37/0272 315/312 |
| 2005/0025480 A1* | 2/2005 | Yeh | ......... | H01H 47/24 398/12 |
| 2008/0185969 A1* | 8/2008 | Vegter | ..... | H05B 37/02 315/158 |
| 2009/0033460 A1* | 2/2009 | Mack | ...... | G08C 23/04 340/5.71 |

* cited by examiner

*Primary Examiner* — Thai Pham
(74) *Attorney, Agent, or Firm* — Li & Cai Intellectual Property (USA) Office (57) ABSTRACT

An illumination device including a voltage transformer module, a switching unit, a control module, a sensor module, a first illumination module and a second illumination module. The switching unit is coupled to the rectifier module and the voltage transformer module. The control module is coupled to the switching unit and the voltage transformer module. The sensor module is electrically connected to the control module. The sensor module senses an invading object within an induction area. The first illumination module is electrically connected to the switching unit. The second illumination module is electrically connected to the sensor module. The sensor module supplies electricity to the second illumination module to emit light. The sensor module outputs a sensing signal to the control module when the sensor module senses the invading object. The control module controls the switching unit to be turned on so that the first illumination module emits light.

12 Claims, 6 Drawing Sheets

ILLUMINATION DEVICE

BACKGROUND

1. Technical Field

The present invention generally relates to an illumination device and, more particularly, to an illumination device for lighting.

2. Description of Related Art

Since the light-emitting diode (LED) has advantages such as low power consumption, high luminance and long lifetime, it has been widely used in various lighting apparatuses. A lighting apparatus includes rectifier circuits, switches, illumination modules and a current source. The illumination module includes a plurality of light-emitting diodes connected in series. The rectifier circuit, for example, a full-wave rectifier circuit rectifies alternate current (AC) power to provide a pulsating direct current supplied to the light-emitting diode. When the light-emitting diodes connected in series are turned on, the current source supplies steady current to the light-emitting diodes in the illumination module.

Generally, an induction lighting apparatus senses an invading object and outputs light with high luminance. When a passerby or a third party enters or stays in an induction area of the induction lighting apparatus so that the induction lighting apparatus senses an invading object, the induction lighting apparatus suddenly emits light with high luminance. Therefore, the passerby or the third party is shocked by the sudden light to even fall down, crash or get hurt. It is inconvenient to use such an induction lighting apparatus.

SUMMARY

The present invention provides an illumination device using a sensor module or a control module to supply electricity to a second illumination module to continuously emit light to enhance the convenience of using such an illumination device.

The present invention provides an illumination device being electrically connected to an alternate current (AC) power source. The AC power source outputs an input voltage that has been rectified by a rectifier module. The illumination device includes: a voltage transformer module, a switching unit, a control module, a sensor module, a first illumination module and a second illumination module. The voltage transformer module is electrically connected to the rectifier module. The switching unit is electrically connected to the rectifier module and the voltage transformer module. The control module is electrically connected to the switching unit and the voltage transformer module. The sensor module is electrically connected to the control module. The sensor module senses an invading object within an induction area. The first illumination module is electrically connected to the switching unit. The second illumination module is electrically connected to the sensor module. The sensor module supplies electricity to the second illumination module to continuously emit light. The sensor module outputs a sensing signal to the control module when the sensor module senses the invading object. The control module controls the switching unit to be turned on so that the first illumination module emits light.

The illumination device in the present invention uses a first illumination module and a second illumination module as a main light source and an auxiliary light source, respectively. After the illumination device is activated, the second illumination module continuously emits light to draw the attention of a user or a third party. When the sensor module senses an invading object, the control module controls the switching unit to be turned on so that the first illumination module emits light. Moreover, the illumination device in the present invention further includes a dimming module for adjusting a pre-set dimming mode of the control module to enhance the convenience of the illumination device.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set forth below in connection with the appended drawings is intended as a description of certain embodiments of the present disclosure, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure.

Figure 1:
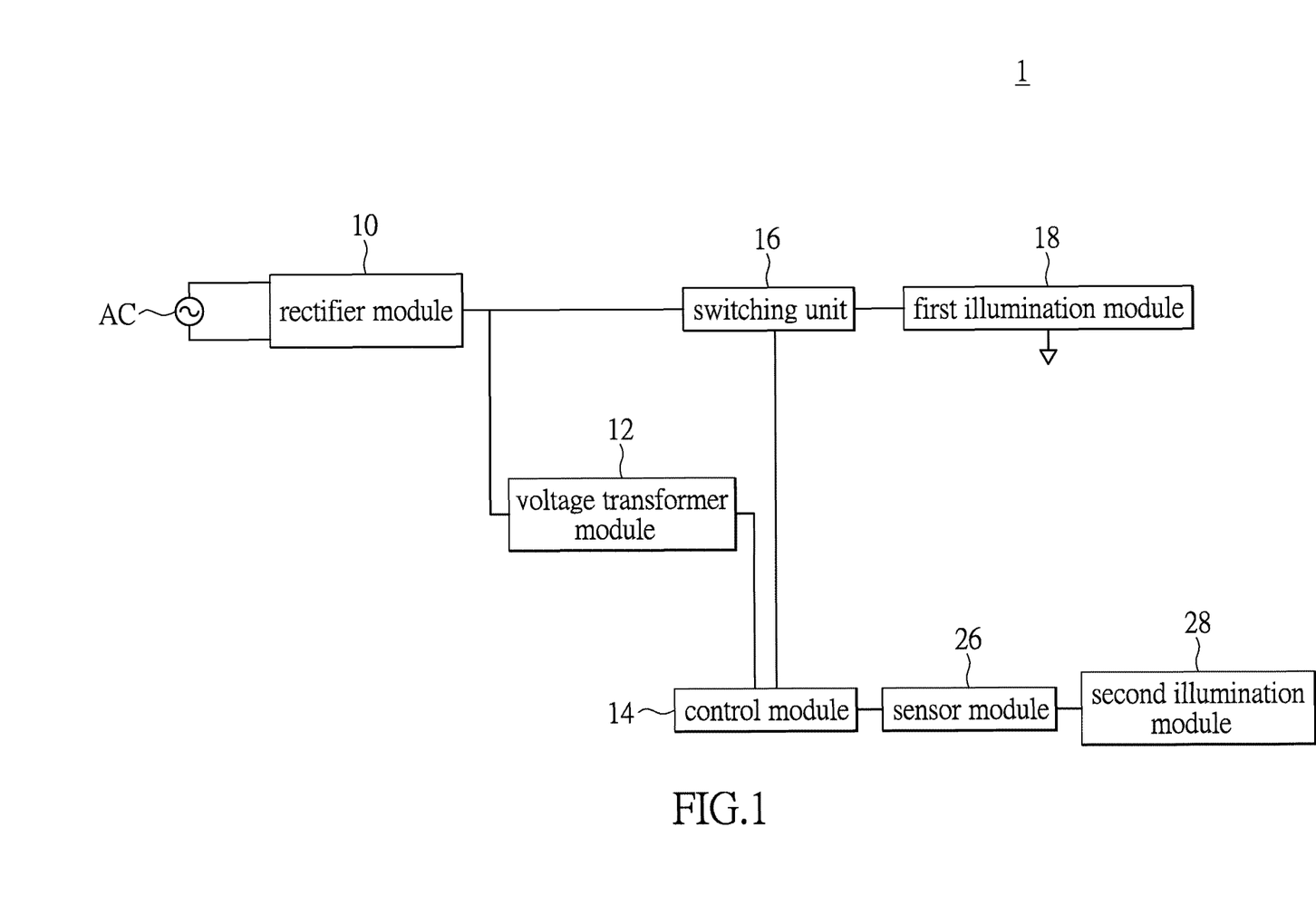
FIG. 1 is a block diagram of an illumination device according to one embodiment of the present invention.

FIG. 1 is a block diagram of an illumination device according to one embodiment of the present invention. Referring to FIG. 1, an illumination device 1 is electrically connected to an alternate current (AC) power source AC. The alternate current power source AC outputs an input voltage that has been rectified by a rectifier module 10. The illumination device 1 includes a voltage transformer module 12, a switching unit 16, a control module 14, a sensor module 26, a first illumination module 18 and a second illumination module 28. Practically, the voltage transformer module 12 is electrically connected to the rectifier module 10, the switching unit 16 and the control module 14. The switching unit 16 is electrically connected to the rectifier module 10, the voltage transformer module 12, the control module 14 and the first illumination module 18. The sensor module 26 is electrically connected to the control module 14 and the second illumination module 28.

The alternate current power source AC provides an AC voltage of, for example, 110 V, 220 V or other voltage values to supply electricity to the illumination device 1. The present invention is not limited to the previous examples of the alternate current power source AC. Then, the rectifier module 10 rectifies and outputs the input voltage. Practically, the rectifier module 10 is, for example, a full-bridge or a half-bridge rectifier circuit, to which the present invention is not limited.

The alternate current power is rectified by the rectifier module 10 to provide pulsating direct current power. The pulsating direct current power is supplied to the control module 14 as the input voltage. Furthermore, the pulsating direct current power has a full-wave or half-wave format. As an example, the rectifier module 10 is, for example, a full-wave rectifier circuit to rectify the alternate current power source AC to provide the control module 14 and the first illumination module 18 with the input voltage. The input voltage is, for example, positive half-cycle full-wave pulsating direct current power. In other embodiments, the input voltage may also be positive half-cycle half-wave pulsating direct current power. The present invention is not limited to the previous example of the input voltage. Herein, the input voltage is exemplified by positive half-cycle full-wave pulsating direct current power.

The voltage transformer module 12 lowers the voltage of the input voltage to a pre-set voltage. For example, the input voltage is lowered to a working voltage required by the control module 14. The working voltage for the control module 14 is, for example, 5V. The voltage transformer module 12 is implemented by, for example, a buck circuit, a buck-boost circuit, a voltage-divider circuit or other transformer circuits. The present invention is not limited to the previous examples of the voltage transformer module 12.

In other embodiments, the voltage transformer module 12 lowers the input voltage to a working voltage required by the sensor module 26. The working voltage for the sensor module 26 is, for example, 5V. Therefore, the voltage transformer module 12 may simultaneously provide the control module 14 and the sensor module 26 with respective working voltages, or first supply electricity to the control module 14 and then supply electricity to the sensor module 26, or first supply electricity to the sensor module 26 and then supply electricity to the control module 14. A person with ordinary skill in the art may make any modifications according to practical demands.

The switching unit 16 includes, for example, one or more power transistors, or one or more field-effect transistors. The present invention is not limited to the previous examples of the switching unit 16. Practically, the switching unit 16 is controlled by the control module 14. When the switching unit 16 is turned on, the alternate current power is rectified by the rectifier module 10 to supply electricity to the first illumination module 18. On the contrary, when the switching unit 16 is turned off, the alternate current power cannot be supplied to the first illumination module 18.

The first illumination module 18 includes one or more AC light-emitting diodes connected in series, one or more AC light-emitting diodes connected in parallel, or a bridge circuit having AC light-emitting diodes. The present invention is not limited to the previous examples of the first illumination module 18. Regardless of the direction of the AC power, the first illumination module 18 can be biased to emit light.

In other embodiments, the first illumination module 18 may also include one or more light-emitting diodes connected in series, one or more light-emitting diodes connected in parallel, or one or more light-emitting diodes connected in series and in parallel. The first illumination module 18 is driven by direct current to emit light. The present invention is not limited to the previous examples of the first illumination module 18.

The second illumination module 28 is implemented by one or more light-emitting diodes connected in series, one or more light-emitting diodes connected in parallel, or one or more light-emitting diodes connected in series and in parallel. The present invention is not limited to the previous examples of the second illumination module 28. Practically, the luminance of the first illumination module 18 is higher than the luminance of the second illumination module 28. The first illumination module 18 is a main light source, and the second illumination module 28 is an auxiliary light source.

It should be noted that the sensor module 26 receives the working voltage to supply electricity to the second illumination module 28. The illumination device 1 is electrically connected to the utility system. The second illumination module 28 continuously emits light and the sensor module 26 continuously senses an invading object after the illumination device 1 is activated. In other words, the sensor module 26 continuously senses the invading object, and meanwhile the second illumination module 28 continuously emits light to draw the attention of the user or the third party.

For example, the general induction lighting apparatus emits light after it senses the invading object. However, when a passerby or a third party enters or stays in an induction area of the induction lighting apparatus so that the induction lighting apparatus suddenly emits light with high luminance, the passerby or the third party is usually shocked by the sudden light. In view of the above, a second illumination module 28 is provided in the present embodiment to continuously emit light to draw the attention of the user or the third party. Therefore, the user or the third party may not be startled by the illumination device 1 suddenly emitting light.

It should be noted that, in other embodiments, the second illumination module 28 is provided with electricity by the control module 14. In other words, the control module 14 receives the working voltage to supply electricity to the second illumination module 28. A person with ordinary skill in the art may make any modifications to decide how the power is supplied to the second illumination module 28.

The control module 14 is electrically connected to the switching unit 16, the voltage transformer module 12 and the sensor module 26. Practically, the control module 14 is implemented by, for example, a microprocessor, a control chip, a processor chip or a control circuit. The present invention is not limited to the previous examples of the control module 14. Practically, the control module 14 switches the switching unit 16 to be turned on or off to control the luminance or the color temperature of the first illumination module 18.

The sensor module 26 senses the invading object within an induction area. Practically, the sensor module 26 is implemented by, for example, an infrared sensor, a microwave sensor, a Bluetooth sensor, an RF sensor or other sensors. The present invention is not limited to the previous examples of the sensor module 26.

The sensor module 26 supplies electricity to the second illumination module 28 to continuously emit light. When the sensor module 26 senses the invading object, the sensor module 26 outputs a sensing signal to the control module 14. The control module 14 controls the switching unit 16 to be turned on so that the first illumination module 18 emits light.

More particularly, when the sensor module 26 senses the invading object, the sensor module 26 outputs a sensing signal to the control module 14. The sensing signal indicates that the control module 14 outputs a pulse waveform signal with a different duty cycle to the switching unit 16. When the sensor module 26 does not sense the invading object, the control module 14 controls the switching unit 16 to be turned on or off according to one of a plurality of pre-set dimming modes.

For example, the control module 14 provides a plurality of pre-set dimming modes. When the control module 14 receives the sensing signal, the control module 14 operates in a pre-set dimming mode with 100% dimming. Therefore, the control module 14 outputs the pulse waveform signal with 100% dimming to the switching unit 16. Accordingly, the first illumination module 18 outputs light with 100% luminance.

On the contrary, when the control module 14 does not receive the sensing signal, the control module 14 operates in a pre-set dimming mode with 25% dimming. Therefore, the control module 14 outputs the pulse waveform signal with 25% dimming to the switching unit 16. Accordingly, the first illumination module 18 outputs light with 25% luminance. In other embodiments, when the control module 14 does not receive the sensing signal, the control module 14 operates in a pre-set dimming mode with 0% dimming or in a pre-set dimming mode with low dimming. The present invention is not limited to the previous examples of the illumination device 1.

As previously stated, in the present embodiment, the second illumination module 28 outputs an auxiliary light and the first illumination module 18 outputs a main light. The second illumination module 28 is electrically connected to the sensor module 26 and is provided with electricity by the sensor module 26 so that the second illumination module 28 continuously emits light to draw the attention of the passerby or the third party. Therefore, the passerby or third party is prevented from being shocked or even getting hurt.

Next, detailed circuit design and operations of the illumination device 1 are presented herein.

Figure 2:
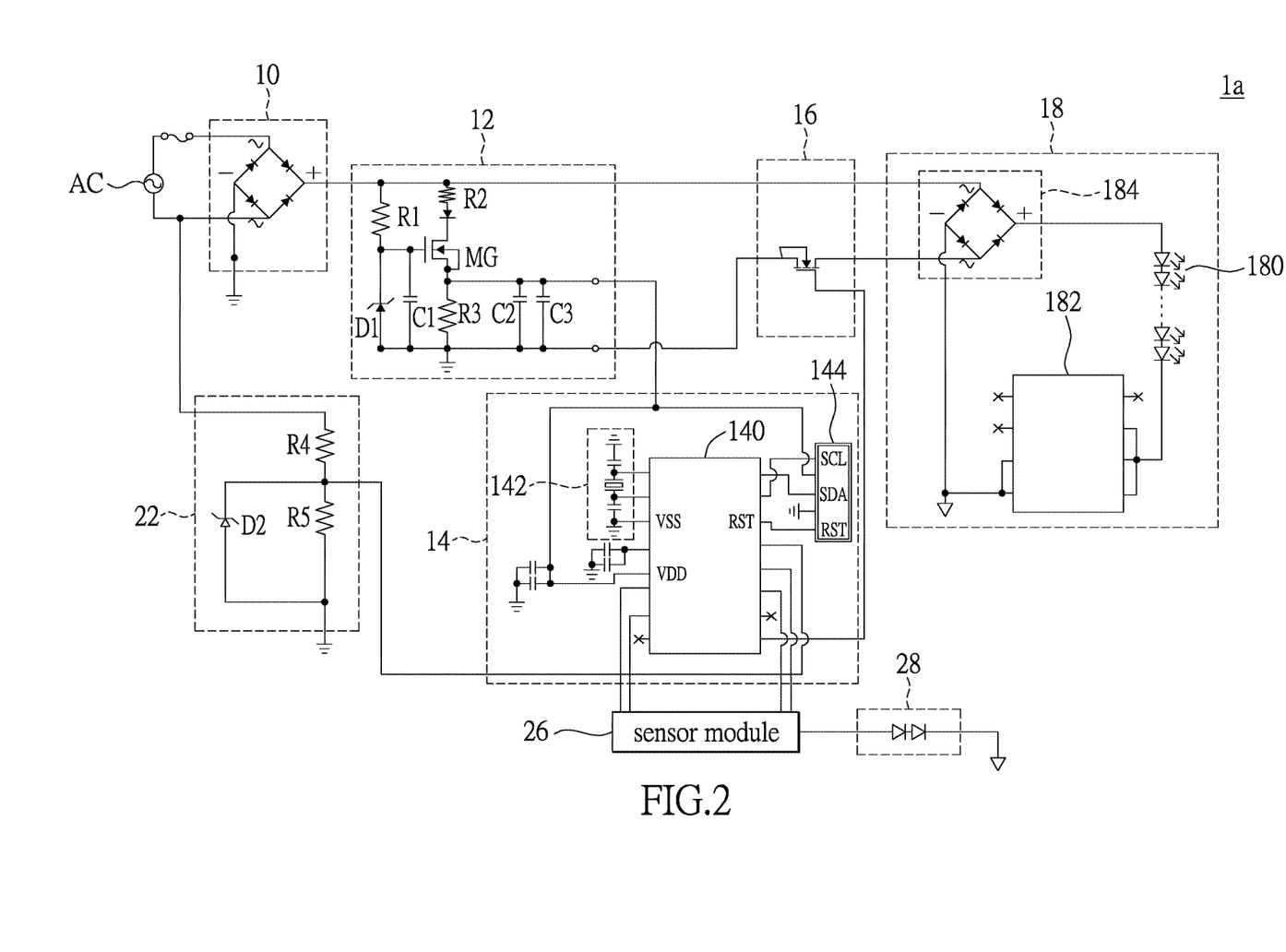
FIG. 2 is a circuit diagram of an illumination device in FIG. 1.

FIG. 2 is a circuit diagram of an illumination device in FIG. 1. Referring to FIG. 2 and FIG. 1, an illumination device 1a is electrically connected to an alternate current (AC) power source AC. The alternate current power source AC outputs an input voltage that has been rectified by a rectifier module 10. The illumination device 1a includes a voltage transformer module 12, a switching unit 16, a control module 14, a voltage-dividing module 22, a sensor module 26, a first illumination module 18 and a second illumination module 28.

More particularly, the voltage transformer module 12 includes a plurality of resistors R1~R3, a diode D1, a switching transistor MG and a plurality of capacitors C1~C2. The gate of the switching transistor MG is electrically connected to one of the resistors R1~R3 and the cathode of the diode D1. The anode of the diode D1 is electrically connected to the source of the switching transistor MG. The resistors R1~R3 include, for example, a first resistor R1, a second resistor R2 and a third resistor R3. The first resistor R1 is electrically connected to the cathode of the diode D1, the gate of the switching transistor MG and the rectifier module 10. The second resistor R2 is electrically connected to the drain of the switching transistor MG and the rectifier module 10. The capacitor C2 and the third resistor R3 are connected in parallel, as shown in FIG. 2.

The switching unit 16 is, for example, a power transistor. The gate of the power transistor is electrically connected to the control module 14. The source and the drain of the power transistor are electrically connected to the voltage transformer module 12 and the first illumination module 18, respectively. A person with ordinary skill in the art should know the function of the power transistor, and description thereof is not repeated herein.

The control module 14 includes a control unit 140, an oscillation unit 142 and a coding unit 144. Practically, the control unit 140 is electrically connected to the voltage transformer module 12, the oscillation unit 142 and the coding unit 144. Practically, the oscillation unit 142 is used to count the time so that the timing and dimming by the control unit 140 can be more precise. In other embodiments, the control unit 140 may have an embedded oscillator. Therefore, the control module 14 may either include an oscillation unit 142 or perform timing and dimming without including an oscillation unit 142. The present invention is not limited to the previous examples of the control module 14.

It should be noted that, the coding unit 144 provides pins for serial clocks SCL, serial data SDA and reset RST. The pins for serial clocks SCL, serial data SDA and reset RST are electrically connected to the control unit 140, respectively. Furthermore, the coding unit 144 receives a pre-set voltage, for example, 5 V as a working voltage outputted by the voltage transformer module 12.

The first illumination module 18 includes a rectifier unit 184, an AC active unit 182 and at least one AC light-emitting diode 180. The rectifier unit 184 is electrically connected to the AC active unit 182 and the at least one AC light-emitting diode 180. The rectifier unit 184 is implemented by, for example, a Wheatstone bridge configuration. Regardless of the direction of the AC power, the first illumination module 18 can be biased to emit light, as shown in FIG. 2.

The rectifier unit 184 is, for example, a full-bridge or half-bridge rectifier circuit. The present invention is not limited to the previous examples of the rectifier unit 184. Moreover, the AC active unit 182 is implemented by, for example, an AC active chip, a bridge active chip or circuit. The present invention is not limited to the previous examples of the first illumination module 18.

Moreover, the voltage-dividing module 22 is implemented by, for example, a voltage-divider circuit. Practically, the control module 14 acquires the alternate current power or power data by the voltage-dividing module 22. Moreover, the resistance of the resistor R5 is larger than the resistance of the resistor R4. In other embodiments, the resistance of the resistor R5 is smaller than or equal to the resistance of the resistor R4. The present invention is not limited to the previous examples of the voltage-dividing module 22.

Figure 3:
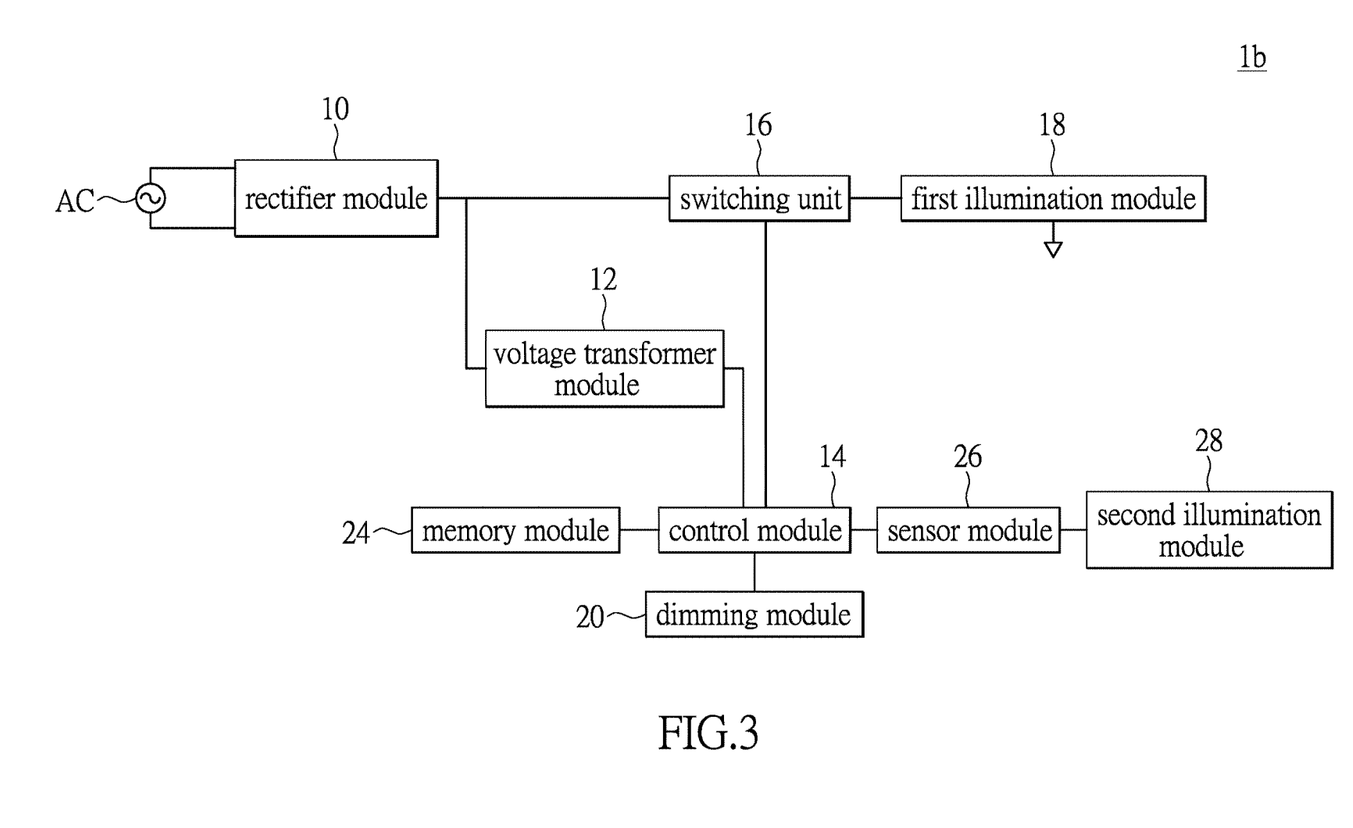
FIG. 3 is a block diagram of an illumination device according to another embodiment of the present invention.

FIG. 3 is a block diagram of an illumination device according to another embodiment of the present invention. Referring to FIG. 3, the illumination device 1b in FIG. 3 is similar to the illumination device 1 in FIG. 1. Identical elements are labeled by identical numbers. The illumination device 1b is different from the illumination device 1 in that the illumination device 1b further includes a dimming module 20 and a memory module 24. The dimming module 20 is electrically connected to the control module 14. The memory module 24 is electrically connected to the control module 14.

More particularly, the control module 14 provides a plurality of pre-set dimming modes. The plurality of pre-set dimming modes indicates that the control module 14 outputs a pulse waveform signal with a different duty cycle to the switching unit 16. The control module 14 generates a pulse waveform signal according to the phase of a triggering pulse and the input voltage.

More particularly, the control module 14 outputs a pulse waveform signal to the switching unit 16 according to the input voltage and a dimming signal. The switching unit 16 is turned on or off according to the pulse waveform signal so that the first illumination module 18 emits light. Practically, the pulse waveform signal has a positive half-cycle waveform according to the input voltage, and is similar to a pulse width modulation (PWM) signal. The switching unit 16 turns on or off a circuit between the alternate current power source AC and the first illumination module 18 according to the pulse waveform signal so that the first illumination module 18 emits light with different luminances.

Moreover, the dimming module 20 is, for example, a switching knob, a switching button, a switch or a wall switch. The present invention is not limited to the previous examples of the dimming module 20. The dimming module 20 provides a plurality of dimming addresses. One of the plurality of dimming addresses indicates that the control module 14 outputs a pulse waveform signal with a different duty cycle to the switching unit 16.

For example, the dimming module 20 is, for example, a switching knob and the dimming module 20 provides four dimming addresses, such as a 100% luminance address, a 75% dimming address, a 25% dimming address and a 0% dimming address. When the switching knob is switched to the 75% dimming address, the dimming module 20 outputs a 75% dimming signal to the control module 14. The control module 14 outputs a pulse waveform signal with a 75% dimming duty cycle to the switching unit 16 according to a pre-set dimming mode with a 75% dimming duty cycle. Accordingly, the first illumination module 18 emits light with 75% dimming luminance.

Furthermore, when the switching knob is switched to the 25% dimming address, the control module 14 outputs a pulse waveform signal with a 25% dimming duty cycle to the switching unit 16 according to a pre-set dimming mode with a 25% dimming duty cycle. Accordingly, the first illumination module 18 emits light with 25% dimming luminance. The present invention is not limited to the previous examples of operations of the illumination device 1b.

Moreover, the memory module 24 is, for example, a non-volatile memory, a volatile memory, an SD card and a flash memory and a combination thereof. The present invention is not limited to the previous examples of the memory module 24. For example, the memory module 24 stores one or more pre-set dimming modes, or stores one or more pulse waveform signals with different duty cycles. The present invention is not limited to the previous examples of the memory module 24.

Figure 4:
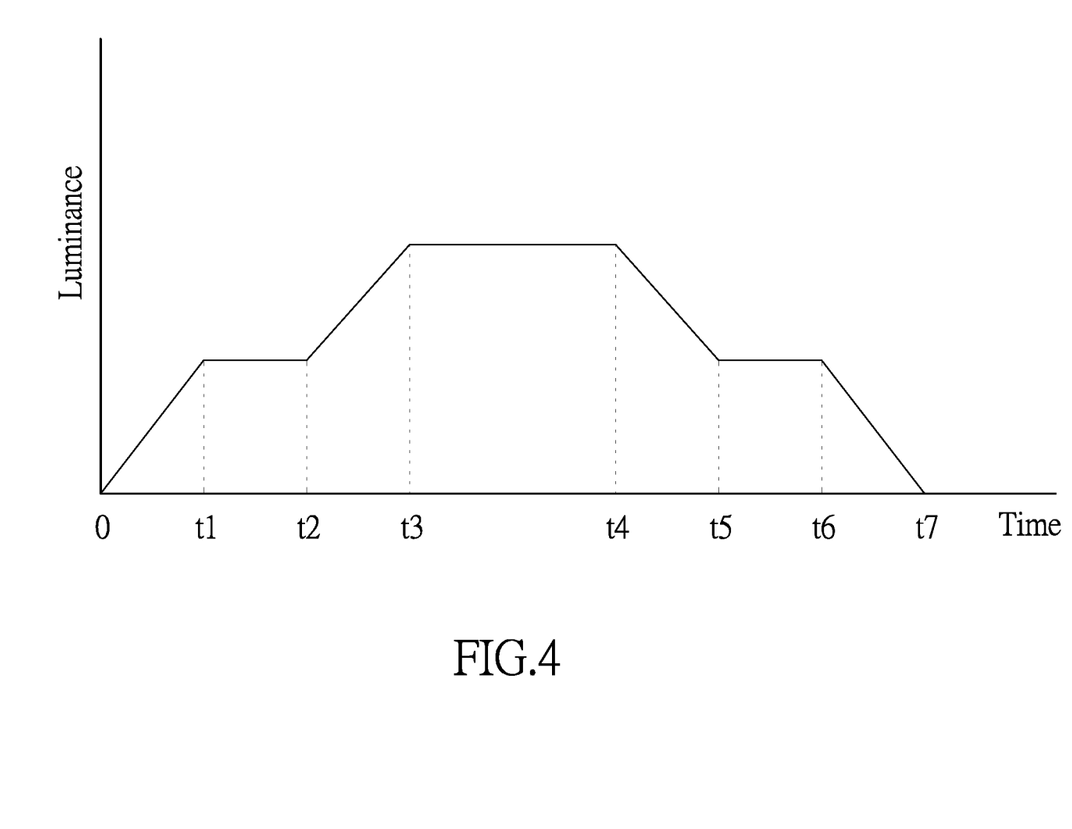
FIG. 4 is a luminance-time waveform of an illumination device according to one embodiment of the present invention.

FIG. 4 is a luminance-time waveform of an illumination device according to one embodiment of the present invention. With reference to FIG. 4, when the sensor module 26 as shown in FIG. 1 to FIG. 3 does not sense an invading object, the second illumination module 28 continuously emits light to draw the attention of the user or the third party. When the sensor module 26 as shown in FIG. 1 to FIG. 3 senses an invading object, the first illumination module 18 outputs light with pre-set luminance and the second illumination module 28 also continuously emits light with lower luminance.

More particularly, after the illumination device 1 is activated, the second illumination module 28 emits light during time 0~t1. The luminance increases linearly from zero to low luminance. Therefore, the second illumination module 28 emits light with constant luminance from time t1. In other words, the second illumination module 28 emits light with low luminance.

At time t2, the sensor module 26 senses an invading object. Therefore, during time t2~t3, the second illumination module 28 emits light with constant low luminance. However, the first illumination module 18 emits light so that the luminance increases linearly from zero to high luminance. However, the luminance of light from the general lighting apparatus rises abruptly from zero to high luminance right after the general lighting apparatus senses an invading object. Therefore, the luminance of light from the general lighting apparatus may shock the user, the passerby or the third party after the general lighting apparatus senses an invading object.

On the contrary, in the present embodiment, the luminance of light from the first illumination module 18 increases linearly from zero to high luminance, instead of abruptly from zero to high luminance. Therefore, in the present embodiment, the luminance of light from the illumination device 1 does not shock the user, the passerby or the third party after sensing an invading object.

Then, the sensor module 26 does not sense the invading object. During time t3~t4, the first illumination module 18 continuously outputs light with high luminance. The control module 14 outputs a pulse waveform signal with 100% dimming to control the switching unit 16 to be turned on or off. The control module 14 outputs a pulse waveform signal with 100% dimming for 10 seconds or a pre-set time period according to the pre-set dimming mode. In other words, the first illumination module 18 emits light with high luminance continuously for a period during time t3~t4.

After the invading object leaves the induction area and the sensor module 26 never senses the invading object again, the first illumination module 18 emits light during time t4~t5. The luminance of light from the first illumination module 18 decreases linearly from high luminance to zero. Therefore, in the present embodiment, the luminance of light from the first illumination module 18 decreases linearly from high luminance to zero, instead of abruptly from high luminance to zero. The second illumination module 28 still emits light with constant low luminance. Therefore, in the present embodiment, the luminance of light from the object sensed by the illumination device 1 decreases gradually, instead of abruptly. Therefore, the user, the visitor, the passerby or the third party will not be shocked or blinded by the light that suddenly turns dark.

During time t5~t6, the second illumination module 28 still continuously emits light with low luminance. Afterwards, at time t6, the illumination device 1 is turned off. During time t6~t7, the second illumination module 28 emits light. The luminance of light decreases linearly from low luminance to zero. Therefore, in the present embodiment, the luminance of light from the second illumination module 28 decreases gradually, instead of abruptly, from low luminance to zero.

Accordingly, in the present embodiment, the luminance of light from the object sensed by the illumination device 1 decreases gradually, instead of suddenly. Therefore, the user, the visitor, the passerby or the third party will not be shocked or blinded by the light that suddenly turns dark. A person with ordinary skill in the art may make any modifications on the slope of the luminance curve, the duration time, addition or subtraction of a certain time period according to the spirit of the present invention. The present invention is not limited to the previous examples of operations of the illumination device 1.

Figure 5A:
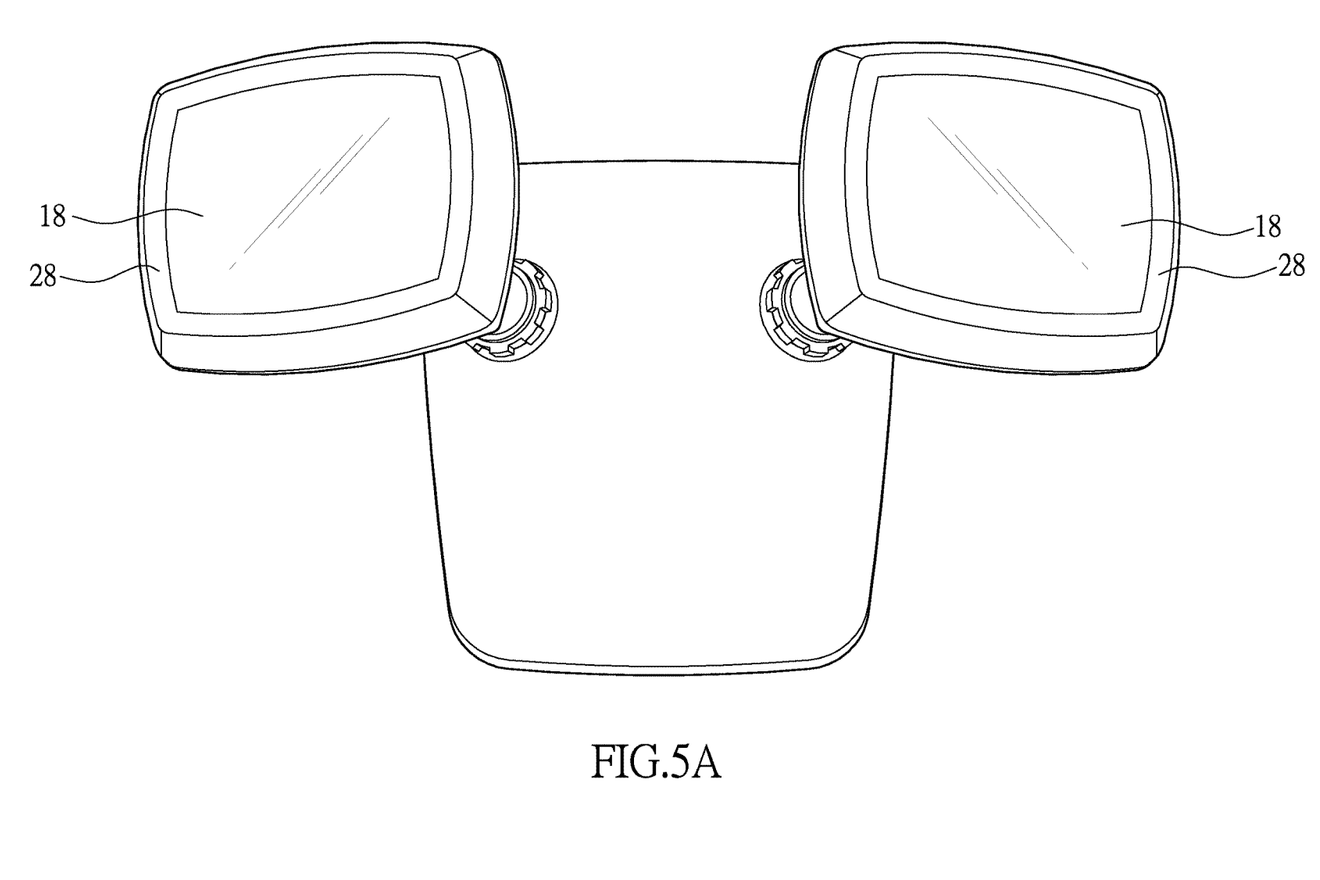
FIG. 5A is a schematic diagram of an illumination device according to one embodiment of the present invention.

FIG. 5A is a schematic diagram of an illumination device according to one embodiment of the present invention. Referring to FIG. 5A, FIG. 5A illustrates a first illumination module 18 and a second illumination module 28. The first illumination module 18 is the main body of the illumination device 1, while the second illumination module 28 is formed surrounding the first illumination module 18. The illumination device 1 including the first illumination module 18 and the second illumination module 28 is as shown in FIG. 5A.

Practically, after the illumination device 1 is activated, the second illumination module 28 emits light with low luminance to form a light circle, by which the user or the third party may pay attention to the illumination device 1. When the sensor module 26 senses the invading object, the first illumination module 18 is activated to emit light with high luminance as a spherical light source. The present invention is not limited to the previous examples of the first illumination module 18 and the second illumination module 28.

Figure 5B:
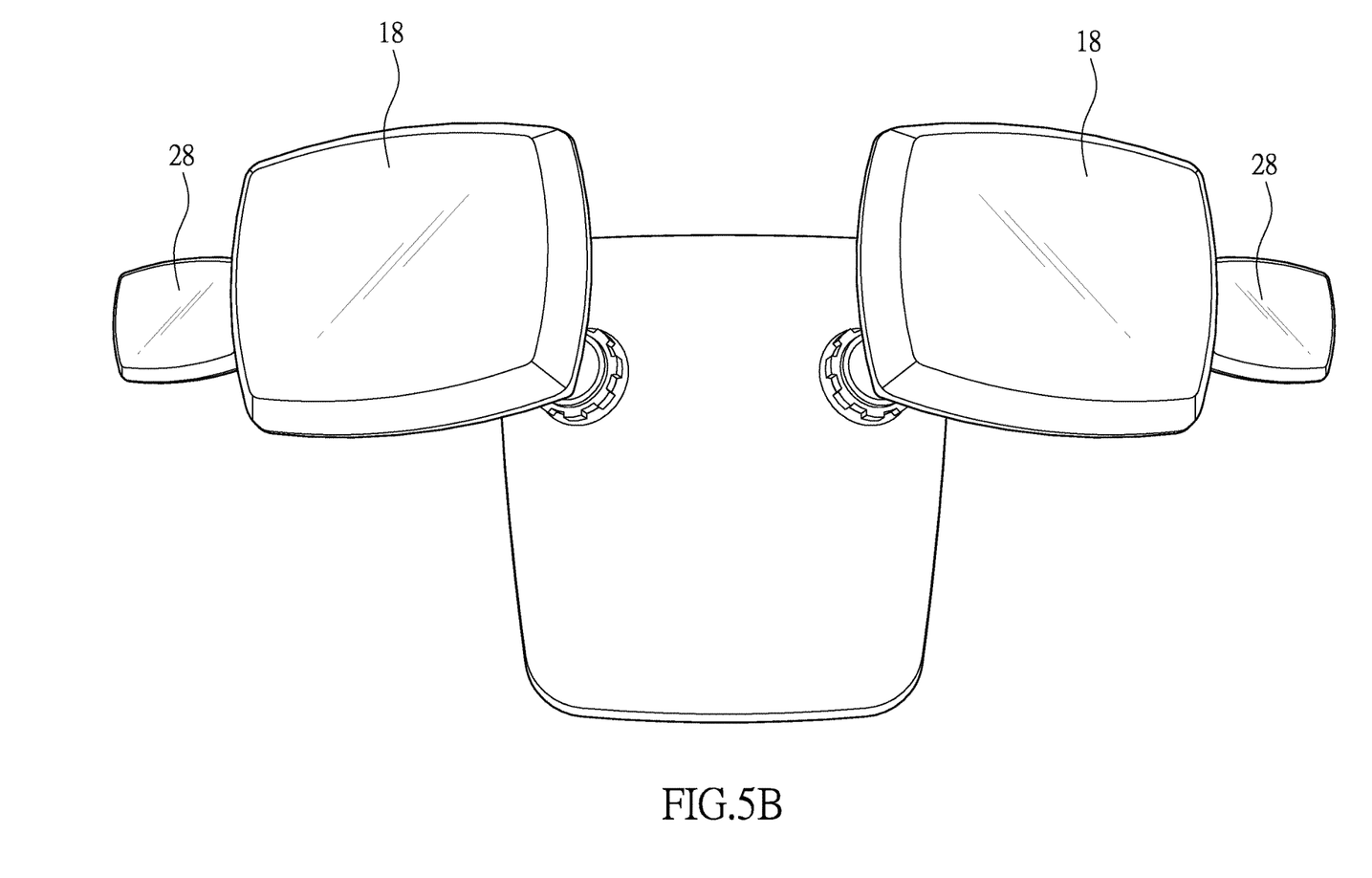
FIG. 5B is a schematic diagram of an illumination device according to another embodiment of the present invention.

FIG. 5B is a schematic diagram of an illumination device according to another embodiment of the present invention. Referring to FIG. 5B, FIG. 5B illustrates a first illumination module 18 and a second illumination module 28. The first illumination module 18 is the main body of the illumination device 1, while the second illumination module 28 is a small light spot near the first illumination module 18. The illumination device 1 including the first illumination module 18 and the second illumination module 28 is as shown in FIG. 5B.

Practically, after the illumination device 1 is activated, the second illumination module 28 emits light with low luminance to form a light spot or a light bar, by which the user or the third party may pay attention to the illumination device 1. When the sensor module 26 senses the invading object, the first illumination module 18 is activated to emit light with high luminance as a spherical light source. The present invention is not limited to the previous examples of the first illumination module 18 and the second illumination module 28.

To sum up, the present invention provides an illumination device that uses a first illumination module and a second illumination module as a main light source and an auxiliary light source, respectively. After the illumination device is activated, the second illumination module continuously emits light with low luminance to draw the attention of a user or a third party. When the sensor module senses an invading object, the control module controls the switching unit to be turned on so that the first illumination module emits light with high luminance. The luminance of the first illumination module is higher than the luminance of the second illumination module. Moreover, the control module outputs a pulse waveform signal to the switching unit according to the input voltage and a dimming signal. The switching unit turns on or off the first illumination module according to the pulse waveform signal to output light with different luminance. The pulse waveform signal is a voltage waveform generated according to the input voltage and the phase of a triggering pulse. The phase of the triggering pulse influences the duty cycle of the pulse waveform signal. The pulse waveform signal has a positive half-cycle waveform according to the input voltage, and is similar to a pulse width modulation (PWM) signal. As a result, the illumination device of the present invention is capable of enhancing the convenience of the lighting apparatuses. The previous embodiments are only exemplary and thus the present invention is not limited thereto.

The above-mentioned descriptions represent merely the exemplary embodiments of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. An illumination device being electrically connected to an alternate current (AC) power source, said AC power source outputting an input voltage that has been rectified by a rectifier module, said illumination device comprising:
    a voltage transformer module, being electrically connected to said rectifier module;
    a switching unit, being electrically connected to said rectifier module and said voltage transformer module;
    a control module, being electrically connected to said switching unit and said voltage transformer module;
    a sensor module, being electrically connected to said control module, to sense an invading object within an induction area;
    a first illumination module, being electrically connected to said switching unit; and
    a second illumination module, being electrically connected to said sensor module;
    wherein said sensor module supplies electricity to said second illumination module to emit light, said sensor module outputs a sensing signal to said control module when said sensor module senses said invading object, and said control module controls said switching unit to be turned on so that said first illumination module emits light.

2. The illumination device of claim 1, wherein said control module outputs a pulse waveform signal to said switching unit according to said input voltage and a dimming signal, said switching unit turns on or off said first illumination module according to said pulse waveform signal.

3. The illumination device of claim 2, wherein said control module provides a plurality of pre-set dimming modes, said plurality of pre-set dimming modes indicating that said control module outputs said pulse waveform signal with a different duty cycle to said switching unit, said control module generating said pulse waveform signal according to the phase of a triggering pulse and said input voltage.

4. The illumination device of claim 3, wherein said sensing signal indicates that said control module outputs said pulse waveform signal to said switching unit so that said control module controls the said switching unit to be turned on or off according to one of said plurality of pre-set dimming modes when said sensor module does not sense said invading object.

5. The illumination device of claim 2, further comprising a dimming module being electrically connected to said control module, said dimming module providing a plurality of dimming addresses indicating that said control module outputs said pulse waveform signal with a different duty cycle to said switching unit.

6. The illumination device of claim 1, wherein said voltage transformer module comprises a plurality of resistors, a diode, a switching transistor and a plurality of capacitors, a gate of said switching transistor being electrically connected to one of said resistors and a cathode of said diode, an anode of said diode being electrically connected to a source of said switching transistor, said plurality of resistors comprising a first resistor, a second resistor and a third resistor, said first resistor being electrically connected to said cathode of said diode, said gate of said switching transistor and said rectifier module, said second resistor being electrically connected to a drain of said switching transistor and said rectifier module, and said plurality of capacitors and said third resistor being connected in parallel.

7. The illumination device of claim 1, wherein said switching unit is a power transistor, a gate of said power transistor being electrically connected to said control module, a source of said power transistor and a drain of said power transistor being electrically connected to said voltage transformer module and said first illumination module, respectively.

8. The illumination device of claim 1, further comprising a voltage-dividing module and a memory module, said voltage-dividing module being electrically connected between said control unit and said alternate current (AC) power source, said memory module being electrically connected to said control module, said control module comprising a control unit, an oscillation unit and a coding unit, said control unit being electrically connected to said voltage transformer module, said oscillation unit and said coding unit.

9. The illumination device of claim 1, wherein the luminance of said first illumination module is higher than the luminance of said second illumination module, said first illumination module is a main light source and said second illumination module is an auxiliary light source.

10. The illumination device of claim 1, wherein said first illumination module comprises a rectifier unit, an AC active unit and at least one AC light-emitting diode, said rectifier unit being electrically connected to said AC active unit and said at least one AC light-emitting diode.

11. The illumination device of claim 9, wherein said first illumination module comprises a rectifier unit, an AC active unit and at least one AC light-emitting diode, said rectifier unit being electrically connected to said AC active unit and said at least one AC light-emitting diode.

12. The illumination device of claim 1, wherein said sensor module receives a working voltage supplying to said second illumination module, said sensor module being an infrared sensor, a microwave sensor, a Bluetooth sensor, a Wi-Fi sensor and a combination thereof.

* * * * *